A. BUGBEE.
Grain-Drill.
No. 50,065.
Patented Sept. 19, 1865.
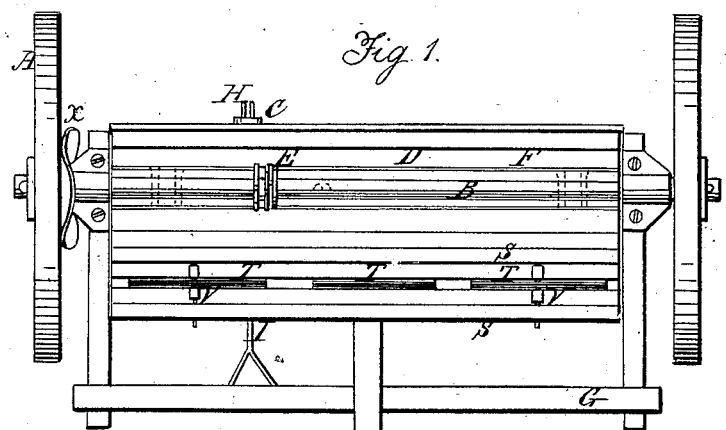
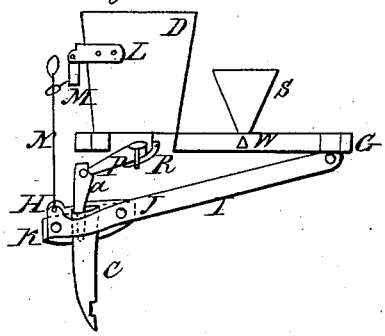
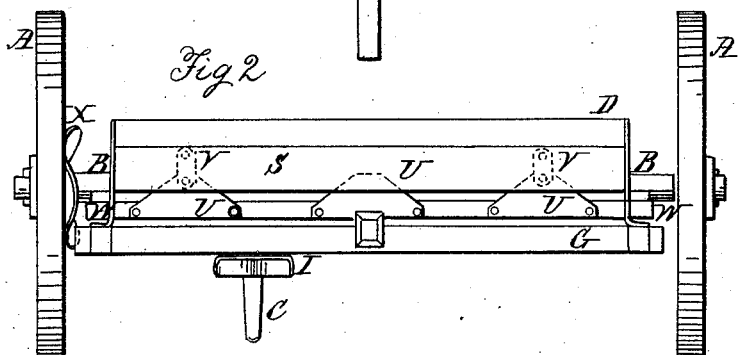
Witnesses
Jacob Franciscus
C. B. Moyer
Inventor
Alpheus Bugbee
by his atty
A. Franklin Rugart

UNITED STATES PATENT OFFICE.

ALPHEUS BUGBEE, OF ELKHART, INDIANA, ASSIGNOR TO HIMSELF AND ANDREW J. FOSTER, OF SAME PLACE.

IMPROVEMENT IN SEED-PLANTERS.

Specification forming part of Letters Patent No. 50,065, dated September 19, 1865.

*To all whom it may concern:*

Be it known that I, ALPHEUS BUGBEE, of Elkhart, county of Elkhart, and State of Indiana, have invented new and useful Improvements in Seed-Planters; and I do hereby declare the following to be an exact description thereof, reference being had to the accompanying drawings, and to the letters of reference marked thereon, making a part of this specification.

The nature of my invention consists in the axle B of the carriage, extending through the hopper D, with its burrs E agitating the grain while its zigzag wheel is operating the vibrating bar of the seed-box S; also fastening the back end of the drag-bar I to the back end of the tooth C, the tooth operating on a pivot in its flange at the back; also, a vibrating bar, W, with upright angular-shaped teeth or plates U, for sowing grass-seeds.

Figure 1 represents a top view; Fig. 2, a front view; Fig. 3, a sectional view of hoppers, tooth, and drag-bar.

A represents the wheels, that are placed on a shaft or axle, B, so as to run seventy-two inches apart. I use eight teeth or hoes, C, and place the end hoes about eight inches from the track of the wheels, and I operate my machine with this single shaft B, and dispense with the usual cog-gearing and additional shaft, making the machine much lighter.

My carriage-axle B runs through the hopper or seed-box D, and on it are placed burrs or spurs E, directly above each tooth C, for the purpose of agitating the grain, to assist the discharge, and to remove pieces of straw and other obstructions that the ordinary floats or agitators do not remove. G, the frame that supports the hoppers.

The teeth or hoes C are attached between the divided ends H of the arms or drag-bars I by a flange at the back side of each hoe, and are fastened at the back ends of the arms I on a pivot, K. The wooden pin J in front breaks and the tooth C swings back when in contact with any obstructions, which is an important advantage, as the arms I, being eight or ten inches shorter than the ordinary arms, allow the drill to run nearer the team, the teeth running steadier and firmer in the ground, and the machine much lighter in weight and draft.

To the ends of hopper, D I have a clip or hinge, L, attached, to which a long lever, M, extending along the back of the hopper, is hinged and revolved. To this lever a rod or chain, N, is fastened to raise the back ends of the arms I, so as to raise the teeth C singly or simultaneously.

I attach a pan or chute, P, to conduct the grain by a spout, Q, to the tooth C, by a leather strap, R, fastened to the frame G. This strap operates as a yielding hinge, so as to be easily replaced when worn out.

In front of the hopper D, I have a seed-box, S, for sowing grass-seeds. This box is V-shaped, with slots T lengthwise in the bottom, about three inches long in a full-sized drill. Angular-shaped vertical teeth U, made of sheet-iron, operate in the slots T, suspended to a hinge, V, above, and fastened at their bottoms to a long vibrating or swinging bar, W, which bar is made to vibrate by attaching a lever or crank and connecting it with the zigzag wheel X of the drill, so as to sow grass-seed when required.

The advantages of my machine are, simplicity in seeding with an ordinary slide. Cog-gearing and an additional cylinder or shaft to drive the slides and agitate the grain, as usual, are dispensed with, and the drag-bars or arms are shorter and lighter, so that my drill weighs but four hundred pounds, while others weigh from six hundred to eight hundred pounds. Consequently it operates with one-half the power and draft of any other grain-drill heretofore used.

What I claim as my invention, and desire to secure by Letters Patent, is—

1. The construction and combination of the spurs E with the carriage-axle or single shaft B, to operate the seeding-slide and agitate the grain, as herein described.

2. Suspending the teeth C at their back side to the rear ends of the arms I, as described.

3. The arrangement, construction, and combination of the plates U with their vibrating bar W, operating in a V-shaped hopper, S, as herein described, for the purpose of sowing grass-seeds.

ALPHEUS BUGBEE.

Witnesses:
DEAN SWIFT,
A. S. DAVENPORT.